United States Patent [19]

Herzog

[11] 4,175,327

[45] Nov. 27, 1979

[54] MEASURING MACHINE

[75] Inventor: Klaus Herzog, Oberkochen, Fed. Rep. of Germany

[73] Assignee: Carl Zeiss-Stiftung, Oberkochen, Fed. Rep. of Germany

[21] Appl. No.: 898,800

[22] Filed: Apr. 24, 1978

[30] Foreign Application Priority Data

Apr. 26, 1977 [DE] Fed. Rep. of Germany ....... 2718506

[51] Int. Cl.² .............................................. G01B 7/02
[52] U.S. Cl. .................................. 33/1 M; 33/174 L
[58] Field of Search ................. 33/1 M, 174 R, 174 L, 33/174 PC

[56] References Cited

U.S. PATENT DOCUMENTS

| | | | |
|---|---|---|---|
| 3,250,012 | 5/1966 | Hilton et al. | 33/174 L |
| 3,286,353 | 11/1966 | Potter | 33/174 R |
| 3,386,174 | 6/1968 | Leach et al. | 33/174 R |
| 3,438,133 | 4/1969 | Brault | 33/1 M |
| 3,749,501 | 7/1973 | Wieg | 33/1 M |
| 3,831,283 | 8/1974 | Pagella et al. | 33/174 TA |
| 3,840,993 | 10/1974 | Shelton | 33/1 M |
| 4,007,544 | 2/1977 | Kirby et al. | 33/1 M |

*Primary Examiner*—Richard R. Stearns
*Attorney, Agent, or Firm*—Hopgood, Calimafde, Kalil, Blaustein & Lieberman

[57] ABSTRACT

The invention contemplates an improved drive and measurement-scale configuration for a measuring machine of the type in which the measuring head and its work-contacting probe are carried in the arch of a gantry which is slidable along base ways (in the x-direction) on opposite sides of a workpiece on which one or more surface points are to be measured for their x, y, and z coordinates. The configuration of x-drive action and x-scale measurement is of inherent precision, with attendant minimizing of displacement error in the measurement of all three positional coordinates of a given point on the workpiece.

4 Claims, 3 Drawing Figures

MEASURING MACHINE

The present invention relates to a measuring machine of the type which consists of a lower part serving to receive workpiece to be measured and an upper part which (a) bridges the lower part in gantry form, (b) carries the measurement head for contacting the workpiece, and (c) is displaceable with respect to the lower part along a guide which extends in one coordinate direction.

Such gantry design in a measuring machine permits compact construction. The upper part of the measuring machine, the so-called gantry, is displaced along the guide on, for instance, two ways extending parallel to each other in order to measure x-coordinates of points on the workpiece, while the measurement head is displaced in the gantry for measurement of the y and z coordinates of corresponding points on the workpiece.

It is known to place the drive for the gantry of such a measuring machine in one of the guideways and at the same time measure the displacement by a scale arranged parallel to said guideway.

Such a unilateral gantry drive has the disadvantage that transverse forces act on the guideways since, during its displacement, the gantry is necessarily subjected to movements about its vertical and transverse axes. The scale for the y-coordinate measurement is arranged, in such measuring machines, in the horizontal plane in which the measurement head is displaced. Since the x and y scales thus lie in different horizontal planes, the comparator principle is not satisfied, which further impairs the results of the measurement.

The object of the present invention is to provide a measuring machine of compact gantry construction in which the drive for the gantry is so effected that no transverse forces act on the guideways and in which the comparator principle is substantially satisfied.

This objective is achieved in accordance with the invention (a) by so positioning the drive for the upper part of the measuring machine as to act, above the workpiece and on the gantry arch or effective center of said part and (b) by so arranging the scale which serves for measurement of gantry displacement as to be parallel to the direction of the drive and substantially at the effective elevation thereof.

In this connection, it is of particular advantage that the drive act on a point of the gantry which, in the central position of the measurement head, coincides (or aligns) with the center of mass of said part.

The scale for measuring along the path of displacement of the upper machine part is preferably arranged in the same horizontal plane as the scale for measuring the displacement in horizontal direction of the measurement head in the upper machine part. In this way, errors resulting from failure to satisfy the comparator principle become smaller the closer to this common plane the measurement is effected.

It is advantageous to arrange the drive for the upper part of the measuring machine in a stand or pedestal which is fixed to the housing and is arranged in a plane lying perpendicular to the base surface of the measuring machine and passing through the vertical axis of gravity of the upper part defined in the central position of the measurement head.

The invention will be described in further detail below with reference to FIGS. 1 to 3 of the accompanying drawings, in which.

Figure 1:
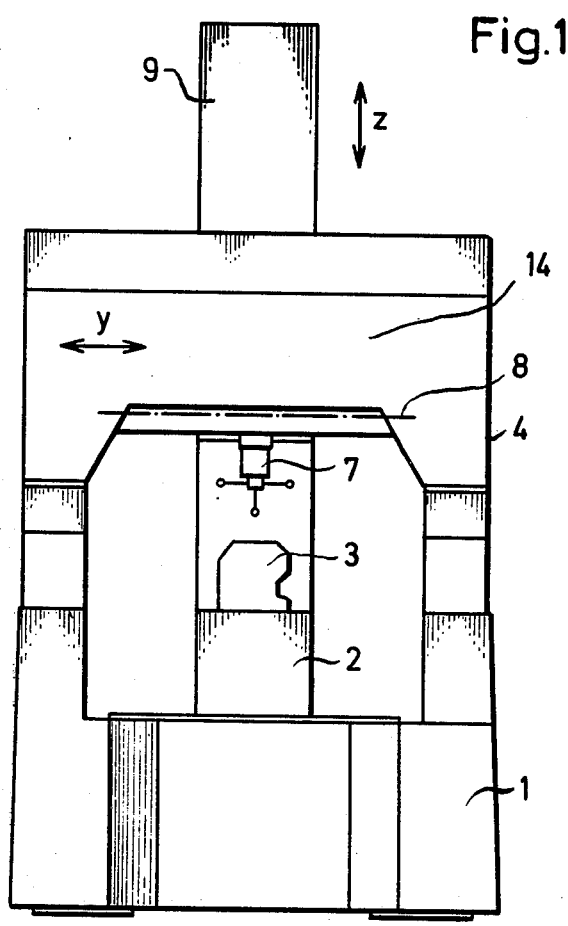
FIG. 1 is a front view of one embodiment of the measuring machine in accordance with the invention.

In the drawings, 1 is the lower part or base of a measuring machine which is equipped with a table 2 to receive a workpiece 3 which is to be measured. The lower machine part 1 is bridged in gantry-like manner by the upper machine part 4. This gantry 4 is displaceable in the x-direction on the lower part 1 by means of two guideways 5 and 6, on opposite lateral sides of the table 2.

In the gantry arch 14 of the part 4 there is provided a measurement head 7 which serves to contact the workpiece 3; the y-drive for head 7 is carried by the gantry arch 14, as is also a scale 8, indicated schematically, which serves for measuring displacement in the y-direction. The measurement head 7 is also displaceable in the z-direction, for which the corresponding drive and scale are arranged in a housing 9 which is rigidly connected to the part 4.

The x-drive, i.e., for displacement of the gantry 4 in the x-direction, is arranged in an upstanding pedestal 10 which is secured to the base part 1. X-drive displacement force is positioned to act between the guideways 5-6 and above the workpiece 3 on the gantry arch 14. In the embodiment shown, the pedestal 10 is arranged in a vertical plane which passes through the vertical axis of gravity of the gantry 4 which is defined when the measurement head 7 is in its central position. The x-drive thus acts on the gantry arch 14 at a point which, in the central position of the measurement head 7, coincides with the center of mass of the gantry. In this way, transverse forces are prevented from acting on the guideways 5-6, upon displacement of the gantry 4 along said guideways.

The drive of the gantry 4 in the x-direction is effected, for instance, via a spindle which is driven by a motor arranged in the pedestal 10. A scale 11 (shown diagrammatically), which is arranged in the same horizontl plane as the y-scale 8, associated with the measurement head 7, is provided in order to measure displacement of the gantry 4.

Figure 2:
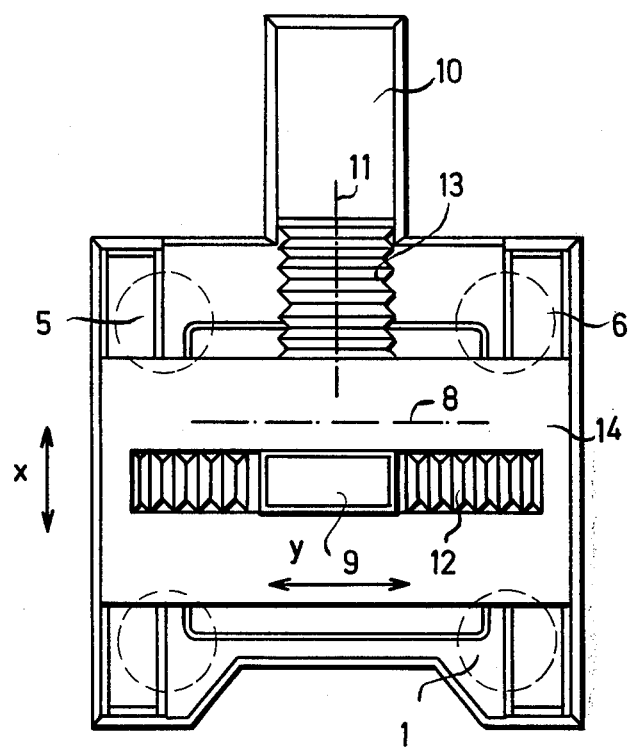
FIG. 2 is a top view of the measuring machine of FIG. 1.
Figure 3:
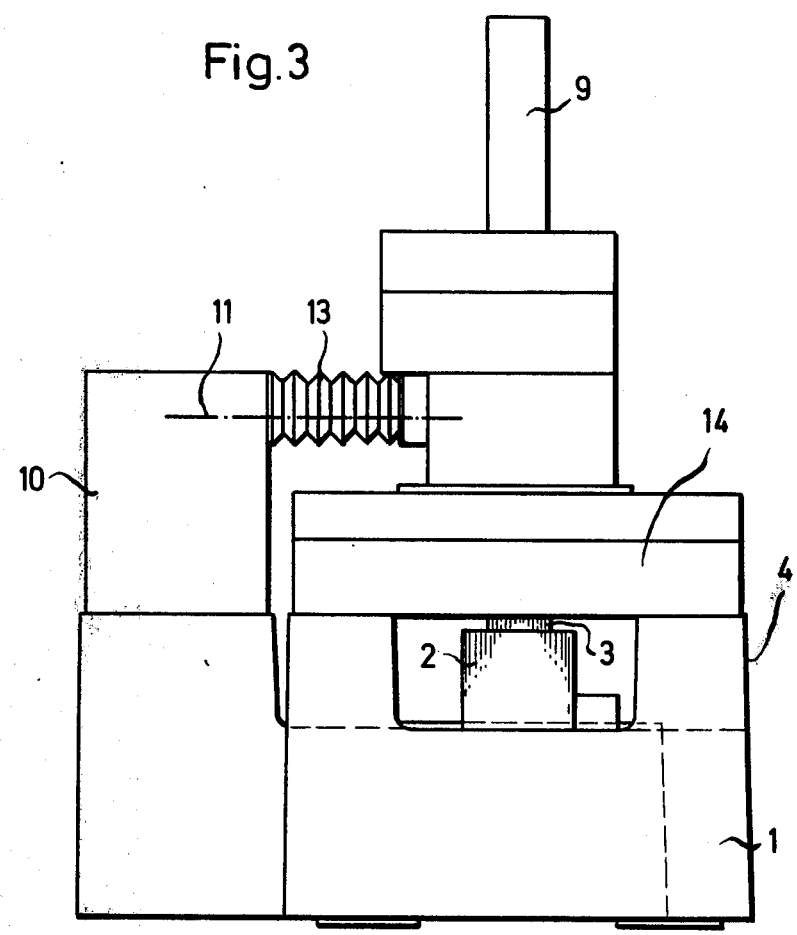
FIG. 3 is a side view of the measuring machine of FIG. 1.

As shown in particular in FIGS. 2 and 3, bellows-shaped bodies 12 and 13 are provided for the dust-proof sealing-off of scales 8 and 11.

Since the combined mass of the measurement head 7 and of the housing 9 is substantially less than the mass of the gantry 4, practically no transverse forces act on the guideways 5-6, even if the measurement head 7 is displaced from its central position when the gantry 4 is moved in the x-direction.

What is claimed is:

1. In a measuring machine wherein a base supports a workpiece to be contacted by a probe of a measurement head for base-referenced determination of the positional coordinates of the probe-contacted point on the workpiece, and wherein a gantry is movable along spaced parallel ways in the base and on opposite sides of the workpiece, the measurement head being movably carried by the arch of the gantry, the improvement in which drive means for positioning the gantry along said ways is so mounted to the base as to apply gantry-positioning force at an elevation above the workpiece and at the arch region of the gantry, and a gantry-displacement measuring scale fixed with respect to the base and oriented parallel to the direction of such gantry-displacement force.

2. In a coordinate-measuring machine comprising a lower part serving to receive a workpiece to be measured and an upper part which bridges the lower part in gantry form and carries a measurement head for contacting the workpiece, said measurement head being displaceable in a first coordinate direction along the gantry arch of said upper part, said upper part being displaceable in a second coordinate direction perpendicular to said first coordinate direction, there being scales disposed parallel to said respective coordinate directions of movement, and separate drives for effecting said respective coordinate directions of movement, the improvement in which the drive for effecting said second-coordinate displacement acts upon the gantry arch of said upper part at a location which is above the workpiece and which effectively coincides with the center of mass of the upper part when the measurement head has a central position of displacement in said first coordinate direction wherein said head is centered on a vertical axis through the center of mass of the gantry arch alone.

3. The improvement of claim 2, in which the scale for indicating displacement in the second coordinate direction is in substantially the same horizontal plane as the scale for indicating displacement in the first coordinate direction.

4. The improvement of claim 2 or claim 3, in which said lower part includes an upstanding pedestal at one end of the path of displaceable movement of said upper part, and in which the drive for effecting displacement in the second coordinate direction is carried by said pedestal and is directionally operative in the vertical plane which is parallel to the direction of second-coordinate displacement and which passes through the center of mass of said upper part.

* * * * *